Nov. 23, 1926.
J. P. SEAHOLM
1,607,646
CULTIVATOR
Filed Oct. 5, 1925
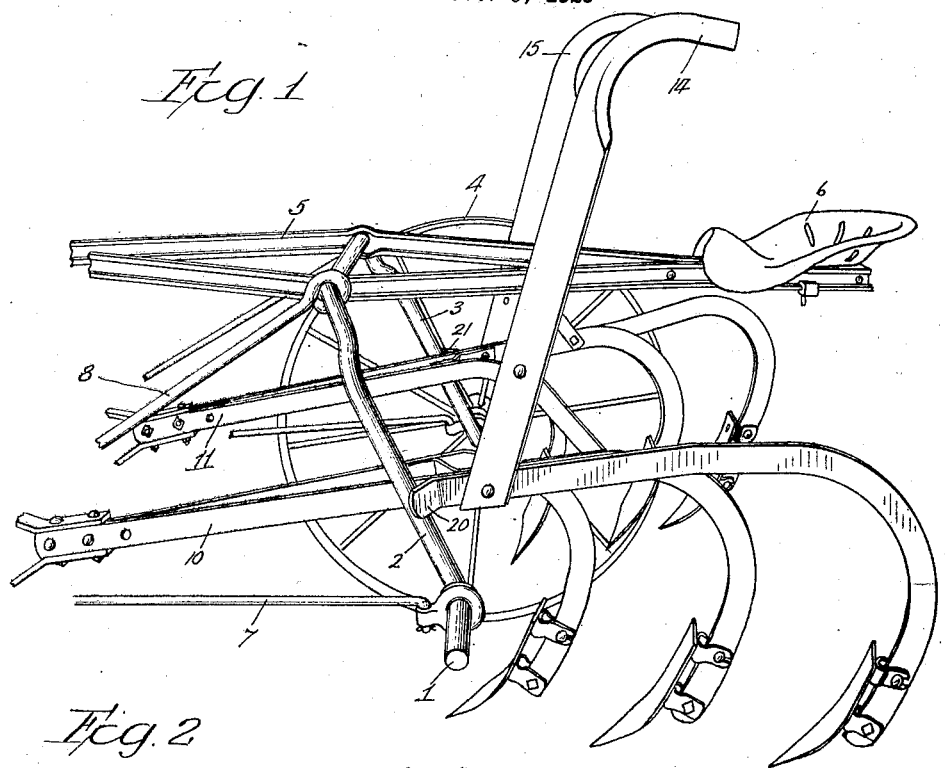
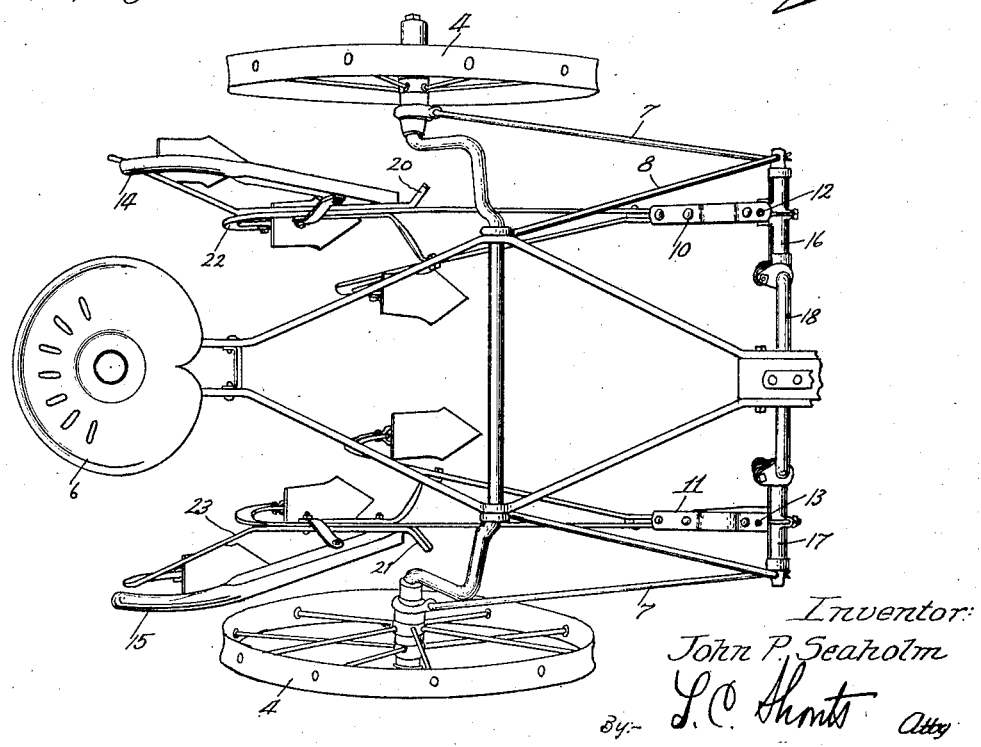
Inventor:
John P. Seaholm Patented Nov. 23, 1926.

1,607,646

UNITED STATES PATENT OFFICE.

JOHN P. SEAHOLM, OF MOLINE, ILLINOIS, ASSIGNOR TO MOLINE IMPLEMENT COMPANY, OF MOLINE, ILLINOIS, A CORPORATION OF ILLINOIS.

CULTIVATOR.

Application filed October 5, 1925. Serial No. 60,374.

The invention relates to a cultivator.

It relates particularly to a construction for supporting the drag bars of a cultivator in transport position.

Cultivators used for cultivating corn, cotton and the like usually have drag bars carrying gangs of cultivator shovels for cultivating the soil. These drag bars are mounted so that they can be raised from a lowered or working position to a raised or transport position. Some means must be provided for holding the drag bars in their raised position and the most usual construction is to have a hook on the cultivator frame which catches on some device on the drag bars to hold them raised. Several extra parts are necessary in order to provide this very necessary feature.

The present invention is the result of concentrated effort toward simplifying cultivator constructions with a view to eliminating unnecessary parts and the resulting construction is one in which the drag bars are supported in raised position without the use of extra parts. In other words, the usual hooks and other devices are unnecessary. The drag bars are held raised by the co-operation of parts which primarily perform other functions but incidentally act to support the drag bars.

The general object of the invention is to provide an improved cultivator.

A more particular object is to provide an improved construction for supporting the drag bars of a cultivator in transport position without the use of extra parts for this purpose.

Other advantages and objects of the invention will hereinafter appear.

An embodiment of the invention is illustrated in the drawings in which—

Figure 1 is a side elevation of the cultivator with the near wheel removed.

Figure 2 is a plan view.

The cultivator has an arched axle 1 which includes two upwardly extending arms 2 and 3. Ground wheels 4 are journalled on the ends of the axle and its upper end supports a frame 5 carrying an operator's seat 6.

The arched axle is inclined forwardly and braced to the frame by the brace bars 7 and 8. The degree of inclination of the axle may be varied to suit the requirements and it can be inclined either forwardly or rearwardly but is preferably inclined forwardly.

The drag bars 10 and 11 are pivoted at the points 12 and 13 to swing laterally. They may also be raised up and down by means of the handles 14 and 15. The mountings which permit this raising and lowering are the sleeves 16 and 17 which are rotatable on the ends of the front arch 18.

The drag bars are built up out of flat metal bars and the outer bars 22 and 23 are bent outward slightly to form projections 20 and 21. These projections are relatively small and do not interfere with the action of the drag bars in cultivating. When the drag bars are in working position they are free to be moved laterally from the position illustrated in Fig. 2 to dodge about the plants being cultivated.

When it is desired to raise the drag bars to transport position, they are lifted by the handles and swung outwardly until they contact the upstanding portions 2 and 3 of the arched axle. They are then lowered slightly until the projections 20 and 21 contact the axle arms. These projections are so located on the drag bars that they will contact the arms at the proper point to hold the drag bars in the required elevated position. The weight of the drag bars holds them in position against being jarred loose in traveling. The arch 18 to which the front ends of the drag bars are pivoted is held rigidly in position by the brace bars 7 and 8 so that it cannot move rearwardly and allow the drag bars to slide down.

The drag bars are thus held in transport position by the co-operation of parts of the structure which primarily perform other functions. For example, instead of using hooks or other special devices the sides of the arched axle act to hold the drag bars raised. Instead of having special devices on the drag bar, a portion of one of the drag bar parts is used to co-operate with the axle. In this way no extra parts are needed. The cost of the cultivator is reduced and its efficiency maintained.

No claim is made in this application to the features of the cultivator other than the drag bar supporting construction, such other features being covered in my co-pending application Serial No. 94,112, filed March 12, 1926.

It is to be understood that the structure shown is for purposes of illustration only and that variations may be made in it without departing from the spirit and scope of the invention as defined by the appended claims.

I claim:

1. A cultivator having an axle provided with upwardly extending arms, and drag bars movable from working to transport position, said drag bars having portions arranged to contact said arms to support the drag bars in transport position.

2. A cultivator having an axle provided with upwardly extending inclined portions, and drag bars movable from working to transport position, said drag bars having portions arranged to engage said inclined portions of the axle to hold the drag bars in transport position.

3. A cultivator having an axle provided with upwardly extending forwardly inclined portions and drag bars movable from working to transport position, said drag bars having outwardly extending portions for engaging said inclined portions of the axle to hold the drag bars in transport position.

4. A cultivator having an axle provided with upwardly extending arms, and drag bars movable from working to transport position, said drag bars being built of flat metal bars one of which is bent outwardly to form a projection to engage the arms of the axle to hold the drag bars in transport position after they have been raised.

5. A cultivator having an axle provided with upwardly extending arms, and drag bars movable from working to transport position, said drag bars carrying projections positioned so as to engage the arms to hold the drag bars in transport position after they have been raised to such position.

6. A cultivator having an axle provided with upwardly extending arms, a rigid drag bar support at the front end of the cultivator, and drag bars pivoted to said support so as to be movable from working to transport position, said drag bars carrying projections positioned to engage the arms of the axle when the drag bars are raised to hold the drag bars in transport position.

In testimony whereof, I affix my signature.

JOHN P. SEAHOLM.